(12) United States Patent
Aeschliman

(10) Patent No.: US 7,343,657 B2
(45) Date of Patent: Mar. 18, 2008

(54) DUCT STRETCHER

(75) Inventor: William M. Aeschliman, Gladwin, MI (US)

(73) Assignees: William Aeschliman, Gladwin, MI (US); Tom Aeschliman, Beaverton, MI (US); Tim Aeschliman, Midland, MI (US); Ray Aeschliman, Midland, MI (US)

( * ) Notice: Subject to any disclaimer, the term of this patent is extended or adjusted under 35 U.S.C. 154(b) by 11 days.

(21) Appl. No.: 11/400,456

(22) Filed: Apr. 7, 2006

(65) Prior Publication Data

US 2007/0234543 A1    Oct. 11, 2007

(51) Int. Cl.
*B60J 7/00* (2006.01)
*B23P 11/00* (2006.01)

(52) U.S. Cl. .................................................... 29/243.5
(58) Field of Classification Search ............... 29/243.5, 29/270, 278, 263, 238–239; 269/3, 6
See application file for complete search history.

(56) References Cited

U.S. PATENT DOCUMENTS

| 3,779,108 A | * | 12/1973 | Reiter | ..................... 81/424 |
| 6,112,404 A | * | 9/2000 | Tarpill | ..................... 29/751 |
| 6,988,433 B2 | * | 1/2006 | LeClair | ..................... 81/487 |

* cited by examiner

*Primary Examiner*—Lee D Wilson
(74) *Attorney, Agent, or Firm*—Robert L. McKellar; McKellar IP Law, PLLC

(57) ABSTRACT

A duct stretcher that is used to conveniently bring the joining ends of a sheet metal air carrying duct system together so that the two ends can be joined and essentially sealed.

1 Claim, 4 Drawing Sheets

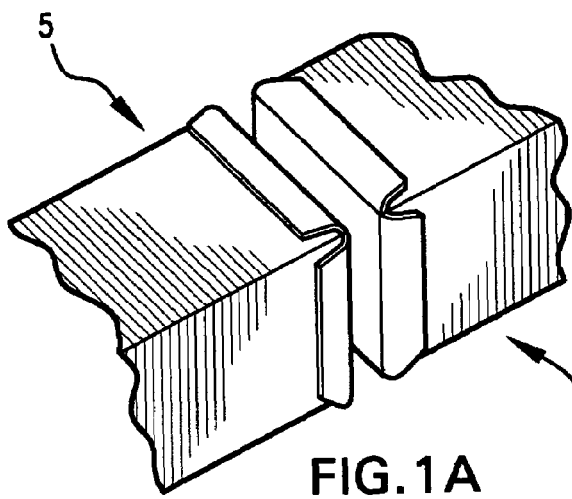
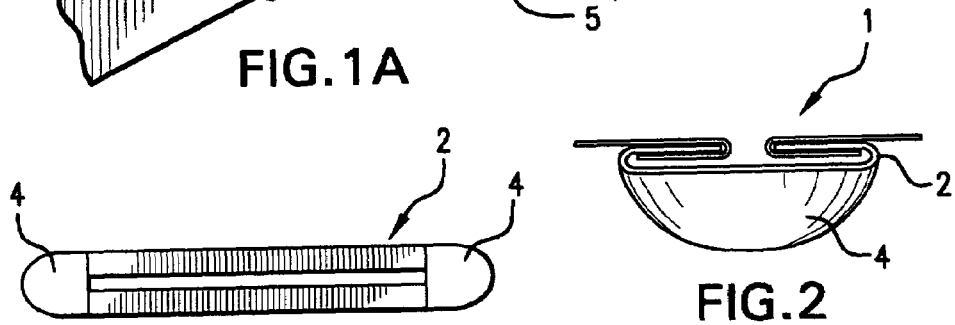
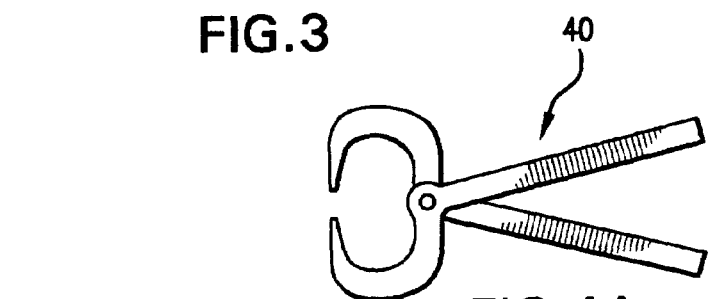
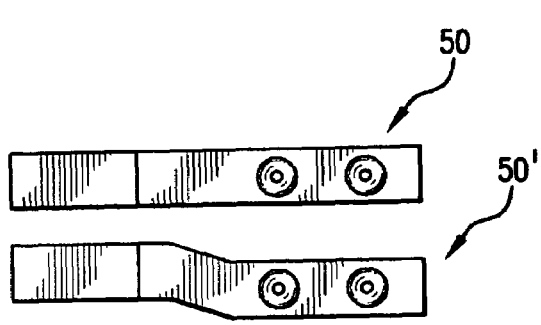
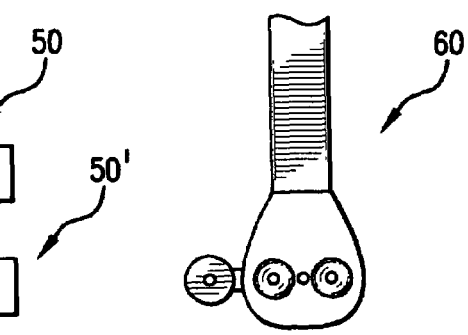

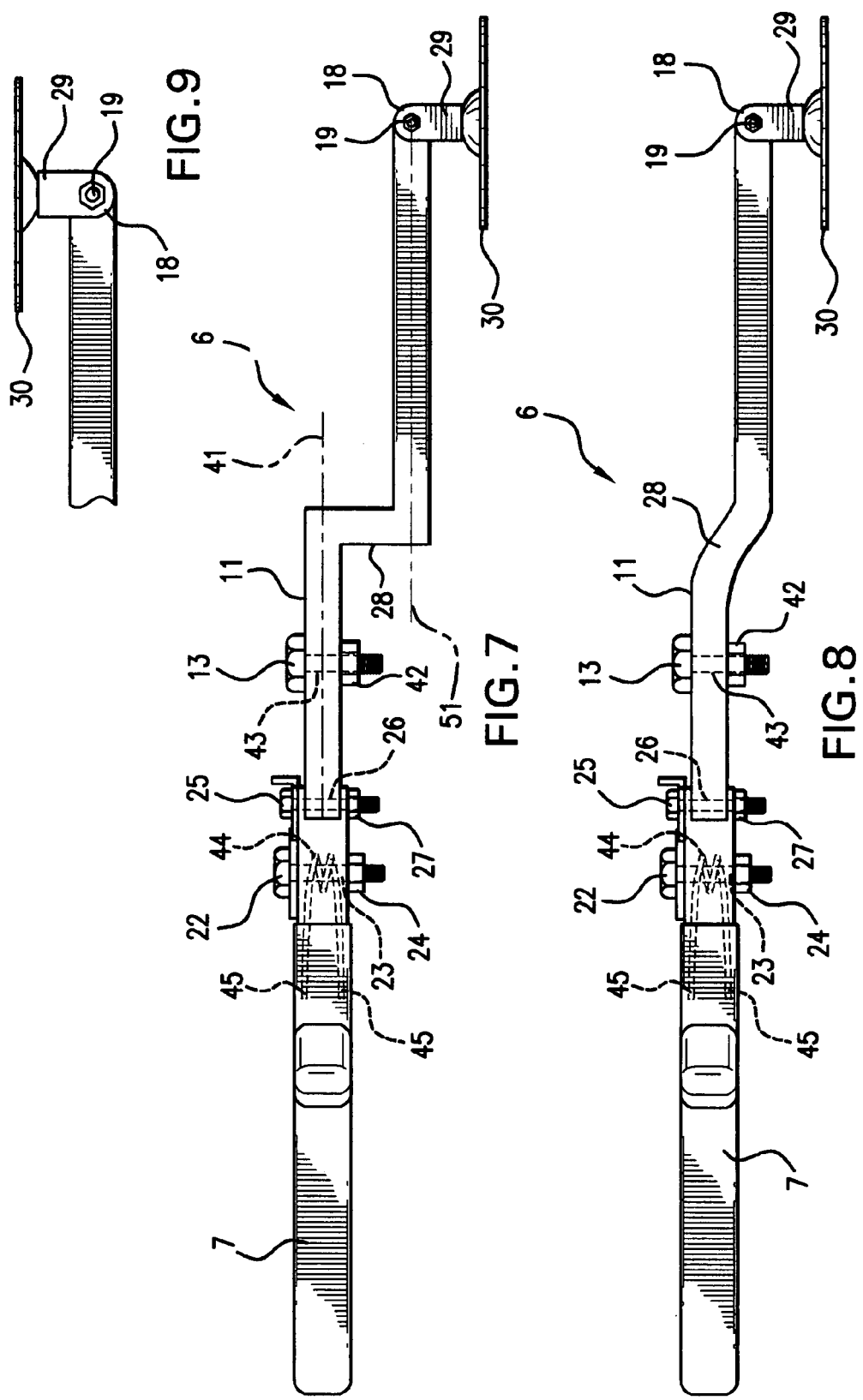

DUCT STRETCHER

FIELD OF THE INVENTION

The present invention relates to a duct stretcher that is used to bring the joining ends of an air carrying duct system together so that the two ends can be joined and essentially sealed.

BACKGROUND OF THE INVENTION

This invention deals with an improved tool for providing a means for connecting the ends of a pair of sheet metal duct segments. There has been a need for a simple tool to bring together the ends of duct segments every since industry needed to convey air or pressurized fluids from one place to another. The ductwork joins a furnace or a HVAC system with various parts of a building to convey the warm air from the furnace to the various rooms or to convey HVAC air from and to various rooms.

The duct work cannot be formed in a single unitary section because of the need to work around corners, avoid piping of other sorts, walls, and the like and thus, duct work is provided in various segments of length. The segments must be joined together in order for the air to be conveyed thereby. The seams for such a joint must be tight in order to prevent the leakage of the air.

Duct systems are conventionally formed in sections and secured together to form longer spans as needed. A duct section is typically formed of sheet metal into a rectangular shape having four sides and bent or seamed corners at the intersection of the sides. A flange of some sort extends essentially perpendicularly outward from each side at both ends of the duct section. The sections are positioned end-to-end so the flanges of one section align with the flanges of the adjacent section and the aligned flanges are fastened together to form the duct assemblies.

When the ends of two duct segments, shown are 5 and 5' in FIG. 1A, are to be joined, they are brought together in close proximity and then various tools or devices are employed to finish the final adjustment to bring the pieces to together where they are finally joined by bolts, screws, connectors, and the like.

For this task, the ends of the duct segments are first formed into structures that will abide a fastener or connectors, and such a common joint 1 can be observed in FIG. 2 of this disclosure. Shown in FIG. 2 is a single bend of the sheet metal back onto itself, but it is common to strengthen the joint 1 by providing joints that have been doubly bent as is shown in FIG. 1B. Further, there is shown in FIG. 2, a top view of a portion of a joint that has been formed by bringing the ends of two duct segments together, drawing them tight with a duct stretcher, and then sliding the connector 2 over the joined joints to hold them in place. Quite often, the connectors 2, shown in FIG. 3 have an end tab 4 on each end that is bent down onto the duct after the connector is put in place.

There are several tools in the prior art for tightening such joints and they are shown as a pincher type in FIG. 4A, bar types with adjacent posts in FIG. 4B, and a tool in FIG. 4C that is a double post with a moveable wheel, all of which have several disadvantages. One of the major advantages that these prior art tools share is the fact that they do not have any set-off feature, that is the capability of set off from the ductwork and thus, they are difficult to work with.

SUMMARY OF THE INVENTION

The present invention improves upon the devices or tools of the prior art by being easy and convenient to use, economically safe for the everyday user, and they are capable of exerting great pressure on the duct end pieces to pull them together without using undue strength. The unique feature of the tools of this invention having a first single pivot point, second double pivot points, and then a third single pivot point allows for the increased pressure created by the device, the pressure being creatable by the mere squeezing of the handles of the device.

THE INVENTION

Thus, this invention deals with a duct stretching tool wherein the tool comprises in combination two handles, each handle having a near end and a distal end and each near end has an inside surface.

Each near end of each handle has a set of laterally projecting tabs. The laterally projecting tabs are spaced from each other and each laterally projecting tab has a centered opening in it. The handles are joined at the laterally projecting tabs by a first pin inserted through the laterally projecting tab centered openings to form a first single pivot point.

The first pin has surmounted thereon a tension spring, that is, the tension spring encircles the pin. The tension spring has extended end segments and each extended end segment projects against a near end inside surface of a handle.

The near end of the handles has a set of forward projecting tabs wherein each of the forward projecting tabs has a centered opening in it. The forward projecting tab centered openings has a second pin through it to form a double pivot point.

There are two arms and each arm is attached to one of the handles at one of the double pivot points. The arm has a near end, a distal end, and a horizontal plane, each said arm having an inwardly extending tab near the arm near end wherein the inwardly extending tabs overlap. The overlapped inwardly extending tabs having a common opening through them and they have a common opening having a fastener through them to pivotally bind the arms together at a single pivot point.

Each first arm has a first continuing segment, each first continuing segment having a second continuing segment wherein the first and second continuing segments project in alignment with the first arm, the first continuing segment having a lower horizontal plane than the first arm and the second continuing segment having a lower horizontal plane than the first continuing segment, the distal end of the second continuing segment having an opening through it.

The distal end has a stirrup rotatably attached thereto by a pin inserted through each opening and each stirrup has a bottom bar, each bottom bar having a wheel attached thereto, each said wheel being rotatable relative to the stirrup.

BRIEF DESCRIPTION OF THE DRAWINGS

FIG. 1A is a view in perspective of portions of two duct segments that are to be joined.

FIG. 1B is a view in of a double bend at the end of the duct segment.

FIG. 2 is a view of a completed joint with the connector in place.

FIG. 3 is a front full view of a connector that is useful in ductwork.

FIG. 4A is a pincer type of duct stretcher 40 of the prior art.

FIG. 4B shows two bar types of duct stretchers 50 and 50' of the prior art.

FIG. 4C is a prior art duct stretcher 60 having two posts and one moveable wheel.

FIG. 7 is a full side view of a device of this invention in which the arems and continuing segments are angled at 90°.

FIG. 8 is a full side view of a device of this invention that shows a sinuous configuration.

FIG. 9 is a portion of the distal end of the second continuing segment in which the wheel 30 is in an upward position.

DETAILED DESCRIPTION OF THE INVENTION

Figure 5:
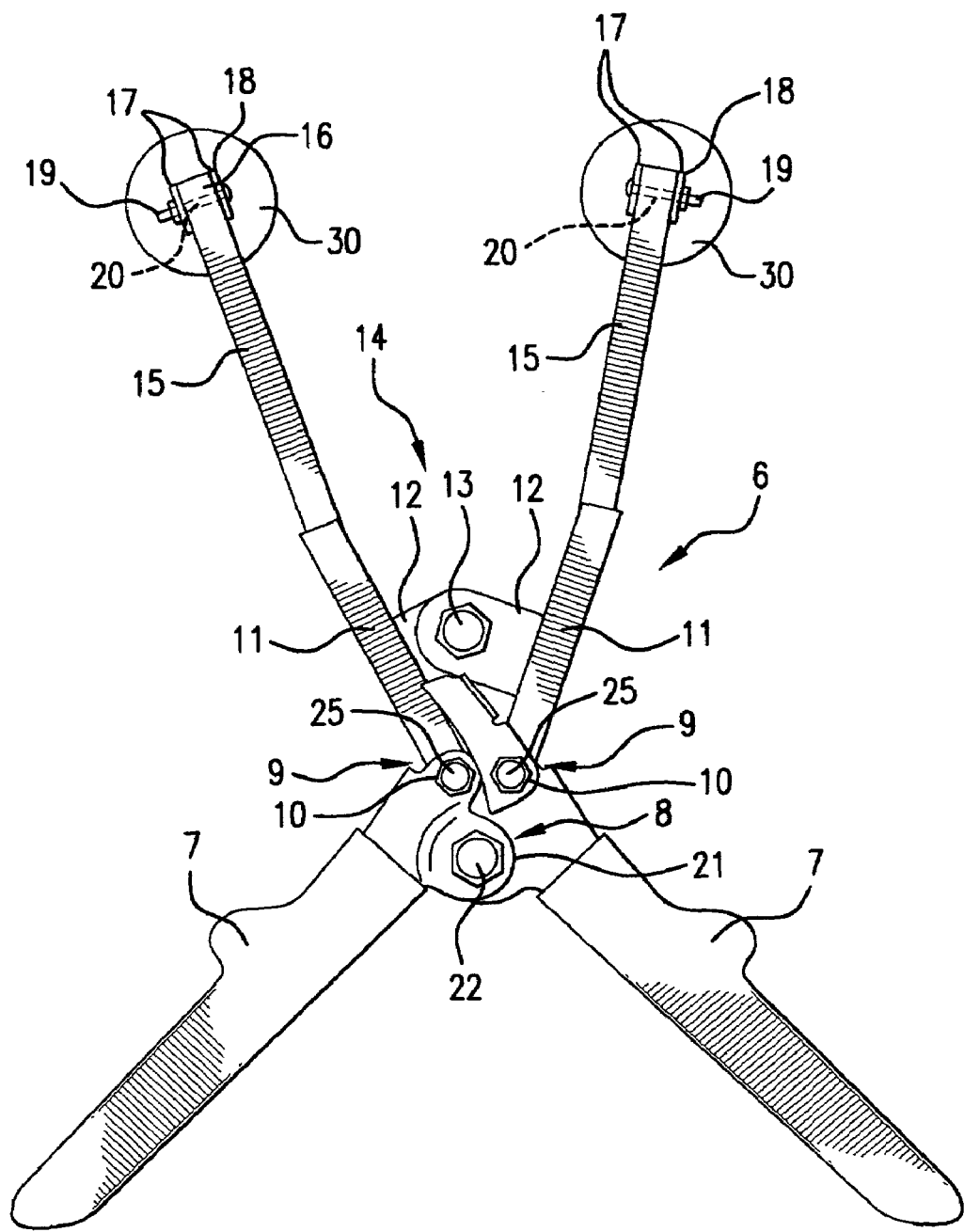
FIG. 5 is full top view of a device of this invention in the expanded or wide open position.
Figure 6:
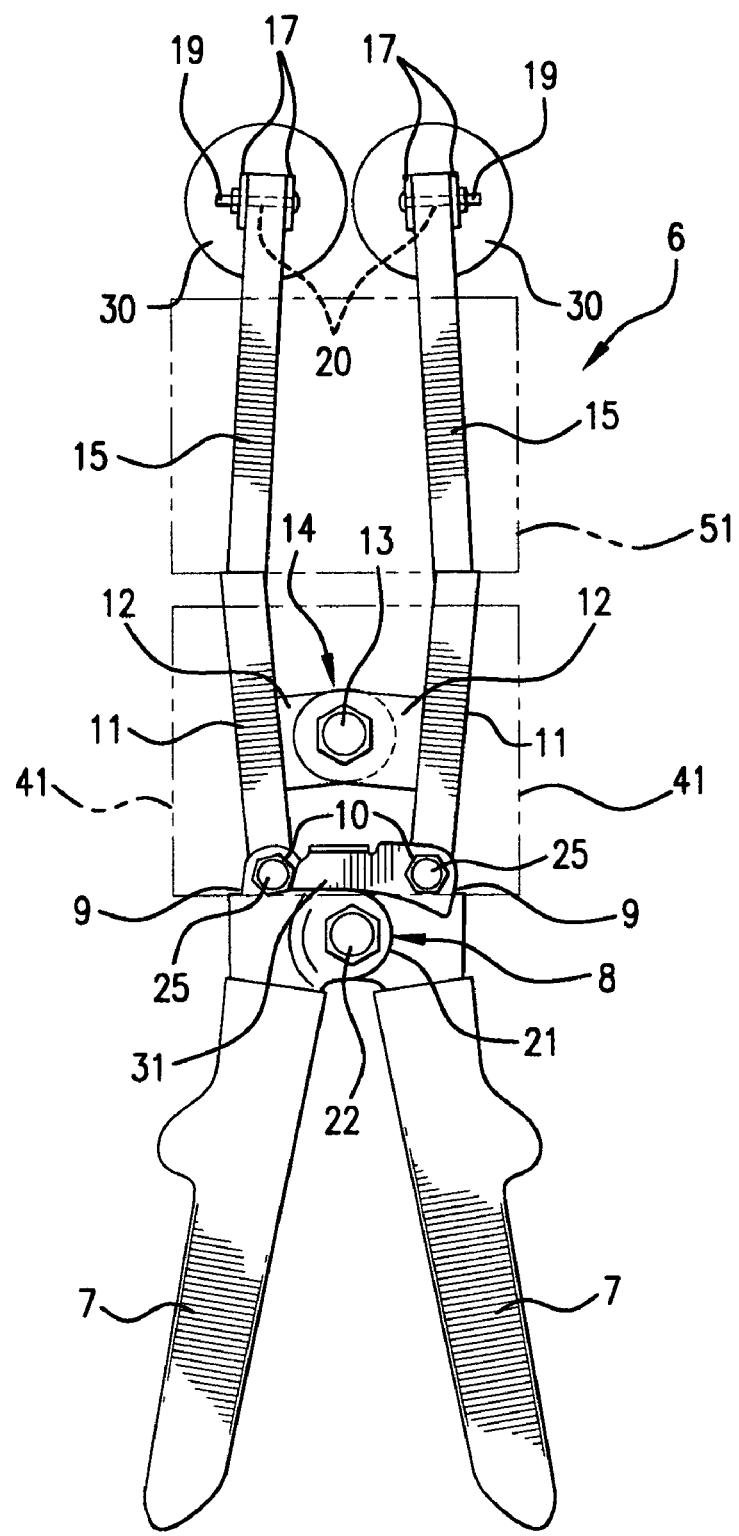
FIG. 6 is a full top view of a device of this invention in the closed and locked position.

Turning now to a detailed description of the invention, there is shown in FIG. 6 a full top view of a tool 6 of this invention in the compressed and locked position showing in combination, handles 7, a first pivot point 8 comprised of overlapping tabs 21 on the handles 7, a pin 22 inserted through openings 23 (not shown in this Figure), the distal ends 9 of the handles 7 showing a double pivot point 10 comprised of pins 25 through openings 26 (FIG. 7), arms 11, inwardly laterally extending tabs 12, a pin 13 inserted in the opening 43, for the tabs 12, and a fastener 42, that forms a second single pivot point 14, and the second continuing segments 15 of the arms 11. At the distal end 16 of the second continuing segment 15 there is shown the top edges 17 of stirrups 18 that are secured in a rotatable fashion to the distal end 16 by a pin 19, inserted through opening 20 (shown in phantom). Also shown are the wheels 30.

Turning now to FIG. 7, there is shown a full side view of a device 6 of this invention in which the components and parts not visible in FIG. 6, are clearly shown. For example, there is shown a pin 22 contained in opening 23 (shown in phantom) with a fastener 24 on the pin 23. Also shown is a pin 25 through opening 26 (shown in phantom) and a fastener 27 for the pin 25.

The first continuing arm segment 28 is shown in FIG. 7. In this Figure, it is shown as a right angled attachment, but it is within the scope of this invention to have an arm and continuing segments that are not angled, such as that shown in FIG. 8, which is a full side view of a device of this invention having a sinuous configuration.

In FIG. 7, there is shown the stirrups 18 that are fastened to lower bars 29 of the stirrups 18. The wheels 30 are then attached to the lower bars 29 by any conventional means such that the wheels will rotate beneath the lower bars 29 in a circular motion. In addition, the stirrups 18 are fastened to the distal end 16 of the second continuing segment 15 by the use of the pins 19 such that the stirrups 18 rotate to allow the wheels to move from a lower position as shown in FIG. 7 to an upper position as shown in FIG. 9 (shown is a portion of the second continuing segment 15).

In FIG. 6, there is shown a conventional lock 31 which swings on a pin 25 that comprises part of the double pivot point 10. This lock 31 is optional on this device.

It should be noted that for purposes of understanding of the invention, the arms 11 have been assigned a horizontal plane 41 as is shown in FIG. 6. The second continuing segments 15 have also been assigned a horizontal plane for purposes of understanding denominated 51 and shown by the dotted line in FIG. 7. The planes are shown in FIG. 7 for comparison purposes, and for purposes of this invention, it should be noted that the horizontal planes of the second continuing segments 15 are below that of the planes of the arms 11. That is so because in this manner, the tool 6 has a set off from the walls of the ducts that are being worked on and in this manner, the tool is more effective because the workman can fully grip the handles 7 of the tool 6.

It should also be noted that the wheels 30 are made rotatable in the fashion described Supra so that the tool 6 can be used in tight spaces and around corners whereas the prior art tools cannot. Thus, the tools of this invention are highly versatile when it comes to their use.

The tools are manufactured from metals in order to retain the strength required for the end use. Preferred metals are aluminum, steel, stainless steel, and cast iron. Especially preferred are steel and aluminum, and mostly preferred is aluminum.

It is optional for the handles 7 of the device 6 to have coverings, such as rubber, plastic, and the like, in order to enhance the grip of an individual on the handles. It is also preferred to use a covering that is raised or has a rough surface so that the grip is enhanced.

The overall dimensions of the device 6 range from about 5 inches to about 14 inches long, and about 2 to about 5 inches in width at the greatest width of the device, so that they are amenable to the various circumstances of use.

The arms, and all continuing segments can be round, square, diamond, rectangular, and the like, in configuration. The size of the wheels 30 can be from about ½ inch to about 1 and ¼ inches in diameter, depending of the ductwork to be used.

It is contemplated within the scope of this invention that the continuing portions of the device 6 can be as cast or welded, or any other conventional means of construction as long as the necessary strength is employed in the materials and construction.

What is claimed is:

1. A duct stretching tool, said tool comprising in combination:
   two handles, each said handle having a near end and a distal end, each said near end having an inside surface;
   each said near end of each handle having a set of laterally projecting tabs therefrom, said laterally projecting tabs being spaced from each other; each said laterally projecting tab having a centered opening therein, said handles being joined at the laterally projecting tabs by a first pin inserted through the laterally projecting tab centered openings to form a first single pivot point,
   said first pin having surmounted thereon a tension spring, said tension spring having extended end segments, each said extended end segment projecting against a near end inside surface of a handle;
   each said near end of the handles having a set of forward projecting tabs, each of said forward projecting tabs having a centered opening therein, said forward projecting tabs centered openings having a second pin therethrough to form a double pivot point;
   two arms, each said arm being attached to one of the handles by one of the double pivot points, each said arm having near end, a distal end, and a horizontal plane, each said arm having an inwardly extending tab near the arm near end wherein the inwardly extending tabs overlap, said overlapped inwardly extending tabs having a common opening therethrough; said common opening having a fastener therethrough to pivotally bind the arms together by a single pivot point;
   each first arm having a first continuing segment, each said first continuing segment having a second continuing segment, the first and second continuing segments projecting in alignment with the first arm, the first continuing segment having a lower horizontal plane than the first arm and the second continuing segment having a lower horizontal plane than the first continuing segment, the distal end of the second continuing segment having an opening therethrough;

each said distal end having a stirrup rotatably attached thereto by a pin inserted through each opening;

each stirrup having a bottom bar, each said bottom bar having a wheel attached thereto, each said wheel being rotatable relative to the stirrup.

* * * * *